March 1, 1960
R. W. HALBERG ET AL
2,926,738
BEARING POSITIONING MECHANISM
Filed July 19, 1957
2 Sheets-Sheet 1
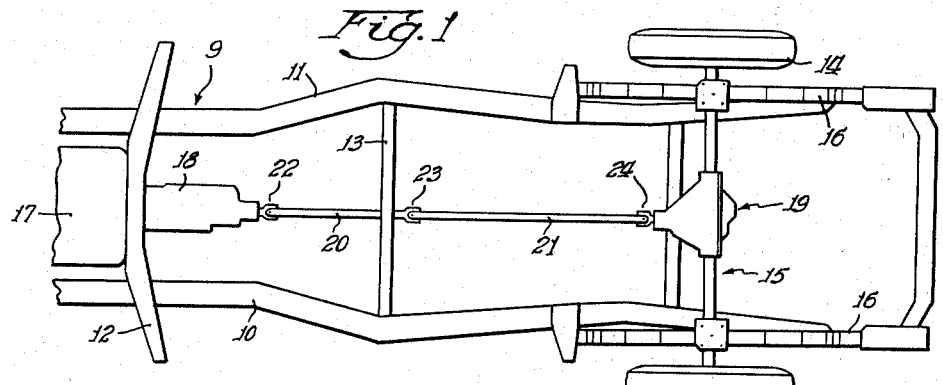
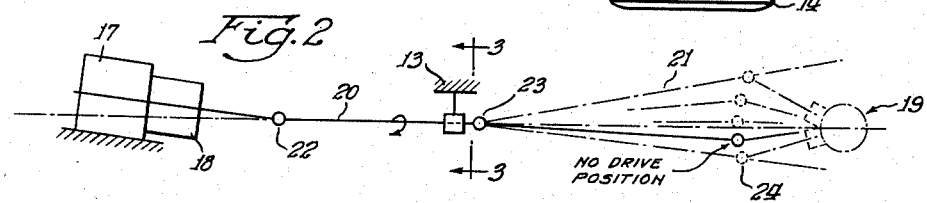
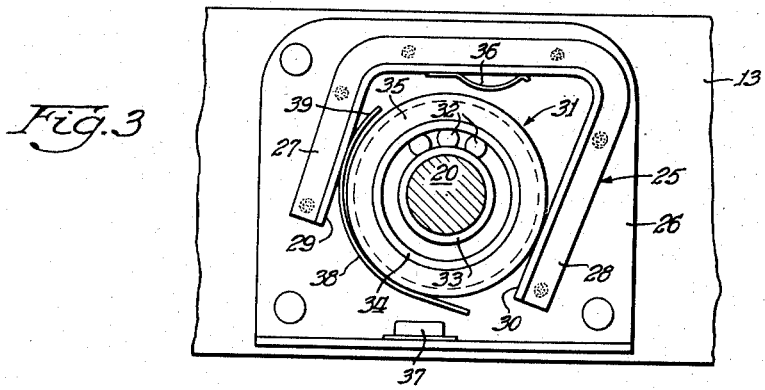
Inventors:
Robert W. Halberg and
Roger S. Hutton
By: Keith J. Bleuer Atty.

March 1, 1960

R. W. HALBERG ET AL 2,926,738

BEARING POSITIONING MECHANISM

Filed July 19, 1957

Inventors:
Robert W. Halberg
and Roger S. Hutton
By: Keith J. Bleuer Atty.

United States Patent Office 2,926,738
Patented Mar. 1, 1960

2,926,738

BEARING POSITIONING MECHANISM

Robert W. Halberg, Des Plaines, and Roger S. Hutton, Wheaton, Ill., assignors to Borg-Warner Corporation, Chicago, Ill., a corporation of Illinois Application July 19, 1957, Serial No. 673,041

20 Claims. (Cl. 180—70)

Our invention relates to bearings for the drive or propeller shafts of automotive vehicles.

In an automotive vehicle employing three or more universal joints in its drive shaft assembly, with two propeller shaft sections connected by means of a center universal joint and with other universal joints positioned at the ends of the shaft sections and with a bearing for one of the shaft sections adjacent the center universal joint, difficulties are encountered in keeping the drive shaft assembly running smoothly when changes in angles occur at the universal joints, such as when high torque is transmitted through the drive shaft assembly causing the rear axle housing to turn so as to move the protuberant forward portion of the differential upwardly and thus wind up on the rear vehicle springs thereby changing the angles at least at two of the universal joints. Such a rotation of the rear axle housing occurs also, but in the reverse direction when the brakes are applied on the vehicle or the vehicle is driven in reverse, resulting in further angular deviations in the above-mentioned universal joints. It should be noted here that dynamic secondary couple bending moments exist in the drive shaft assembly when in operation at such angles, which cause undue vibration or roughness unless corrective means are employed; this is so because these secondary couple bending moments produce dynamic forces acting on the bearing as well as a resultant static force. These secondary couple bending moments are those in the propeller shaft assembly due to the angles made at the universal joints and occur at a frequency of two times the propeller shaft rate of rotation and these introduce forces whose vibratory components are objectionable particularly at the bearing. These couples are developed essentially because of the shapes and motions of the parts of the universal joints when operating at an angle and are a maximum when the yokes of the joints causing the couples are at right angles to the plane containing the two shaft sections. Under the conditions mentioned above, the shaft sections remain substantially in line looking from either the top or bottom of the vehicle, and the plane of the shaft sections just mentioned thus is a vertical plane.

The resultant static force is the vector sum of the static forces existing at the bearing due to the secondary couple bending moments, and this resultant static force acts substantially horizontally and in a direction dependent on the torque and joint angles.

The resultant dynamic force is the vector sum of the vibratory forces existing at the bearing due to the secondary couple bending moments.

If the automotive vehicle is designed with a normally small or no angularity at the universal joint adjacent the differential, sudden acceleration causes the differential to wind up on the springs of the automotive vehicle, thereby causing a large angle at the universal joint, with the differential apex pointing upwardly, which results in the horizontal static force at the bearing acting from right to left as viewed from the rear of the automotive vehicle. The application of the brakes reverses the process causing the nose of the differential to move downwardly and produce a large angle at the universal joint causing the horizontal static force to act in the other direction.

In constructing a vehicle employing three universal joints connecting two drive shaft sections in the drive shaft assembly, effort is made to keep in line as much as possible the drive shaft sections, commensurate with the other problems encountered in the construction of the vehicle. In a drive shaft assembly of this type, a bearing for one of these drive shaft sections is carried by a frame cross member or other support means to support the drive shaft assembly. However, a rigidly attached bearing does not operate satisfactorily to prevent drive shaft vibration when the drive shaft alignment is interfered with to too great an extent, as occurs when the rear axle housing winds up either forwardly or reversely as mentioned above.

It is an object of our invention to provide an improved bearing support for a central portion of the drive shaft assembly which not only will take the reaction of the drive shaft assembly from these resultant static and vibratory forces with respect to the frame of the vehicle but will also automatically position the bearing so that the resultant vibratory forces are minimized for the various conditions of the operation of the vehicle.

We have found that usually as the resultant vibratory forces increase, there is a corresponding increase in the resultant horizontal static force at the bearing for the drive shaft assembly, and it is an object also to so construct the support mechanism for the bearing that the resultant static force will cause the automatic positioning of the bearing to minimize the resultant vibratory forces at the bearing.

Assuming that there is no substantial angularity between the propeller shaft sections as seen from either the bottom or top of the vehicle chassis, as is true with conventional vehicle drive shaft assemblies, we have found that the bearing should be repositioned from the best normal drive position as the differential rotates upwardly with increased driving torque to the rear vehicle driving wheels in order to minimize the resultant vibratory forces on the drive shaft bearing, and it is, accordingly, an object of the invention to provide a bearing support mechanism for the drive shaft assembly which will automatically reposition the bearing of the drive shaft assembly as the resultant horizontal static force on the bearing changes.

It is a more particular object to provide a bearing support mechanism for the drive shaft assembly comprising a pair of ramps having a bearing floating therebetween and mounted on a part fixed with respect to the vehicle frame or body so that the resultant horizontal static force mentioned above will cause the bearing to move between the ramps as the resultant horizontal static force changes, with little change sidewise of the bearing.

Another object of this invention is to provide such a mechanism in connection with the bearing which provides multiple stages of yielding, an initial relatively weak yielding stage being effective to support the weight of the middle portion of the drive shaft assembly and bearing and also being effective for transmission of relatively small torque through the drive shaft assembly and a subsequent relatively hard yielding effect being effective for transmission of large torque through the drive shaft assembly.

The invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

Fig. 1 is a bottom view of the major portion of a vehicle chassis showing the drive shaft assembly connected to the transmission at one end;

Fig. 2 is a side diagrammatic view of the drive shaft assembly showing the extremes of movement of certain parts of it under the influence of vehicle driving torque and vehicle braking torque;

Figure 5:
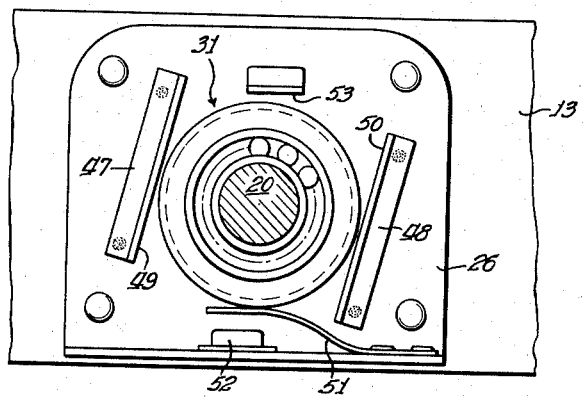
Figure 6:
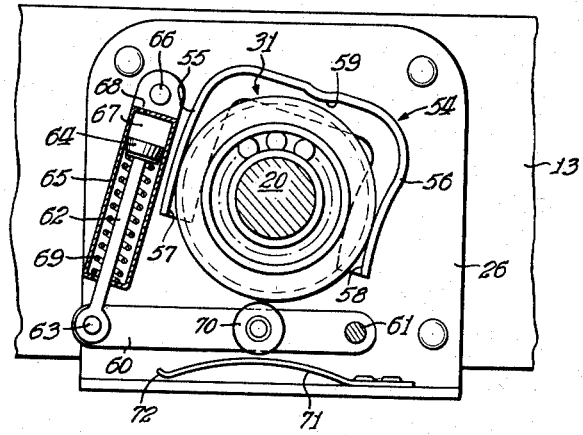

Fig. 3 is an enlarged sectional view on a plane indicated by line 3—3 in Figure 2 of a bearing support mechanism embodying the principles of the invention; and Figs. 4, 5, and 6 are enlarged sectional views on a plane indicated by line 3—3 in Figure 2 of alternate bearing support mechanisms of the present invention.

Like characters of reference designate like parts in the several views.

Referring now to the drawings, in Fig. 1 there is illustrated a conventional automobile frame 9 comprising two side frame members 10 and 11. The frame members 10 and 11 are connected together by a plurality of cross frame members including the cross frame members 12 and 13. The rear driving wheels 14 of the vehicle mounted on the rear axle assembly 15 are supported with respect to the frame 9 by means of rear springs 16 fixed with respect to the side frame members 10 and 11.

The usual vehicle engine 17 is mounted on the front end of the frame 9 and has a conventional transmission 18 connecetd thereto. The axle assembly 15 comprises the usual differential 19, and drive shaft sections 20 and 21 are utilized for providing a driving connection between the transmission 18 and the differential 19. Universal joints 22, 23 and 24 are provided respectively between the transmission 18 and the drive shaft section 20; between the sections 20 and 21, and between the section 21 and the differential 19.

Referring now to Fig. 3, the drive shaft section 20 is mounted with respect to the cross member 13 by means of a U shaped bearing support 25 formed out of angle iron and mounted on a flanged backing plate 26 fixed on the cross frame member 13. The support 25 comprises two dependent ramps 27 and 28 having inner faces 29 and 30 respectively. A bearing 31 is disposed between the ramps 27 and 28 and comprises a plurality of balls 32 disposed between an inner race 33 and an outer race 34 which is encompassed by a rubber ring 35. The drive shaft section 20 extends through the inner race 33. Upper and lower stops 36 and 37 are mounted with respect to the support 25 and the lower flange of the backing plate 26 respectively. The upper stop 36 is a flat spring with a downward extending bowed portion adapted to engage the outer periphery of the rubber ring 35. The lower stop 37 is a rectangular shaped block of metal. A C spring 38 supporting the bearing 31 is connected to the inner face 29 of the ramp 27 and has a top extension 39 inclined toward the ramp 28. The ramp 27 extends obliquely downwardly at an obtuse angle at its inner face 29 with respect to the horizontal, and ramp 28 extends obliquely downwardly and forms an acute angle at its inner face 30 with respect to the horizontal. The ramps 27 and 28 converge, so that the space between the ramps 27 and 28 is reduced at their lower ends. Attention is called to the fact that the bearing mechanism or any part thereof is not necessarily limited to the cross frame member as support means for attachment.

In the operation of the vehicle, when the vehicle is initially started, the torque on or tendency of the rear axle assembly 15 to rotate in a clockwise direction as seen in Figure 2 in driving the vehicle through the rear wheels 14, is impressed on the frame 9 through the rear springs 16. This winding up of the rear axle on the rear springs 16 is roughly in proportion to the torque being transmitted and changes the angles of the universal joints 23 and 24 roughly in proportion to the amount of said wind up as may be seen by referring to Figure 2. It should be pointed out, however, that other factors will cause a change in the angles of said universal joints 23 and 24 such as, variation in the load carried by the vehicle and the deflection of the springs when the vehicle hits uneven spots in the road during its operation. It should be further pointed out that vehicles of different makes have different universal joint angles in the drive shaft assembly under static and dynamic conditions and other differences in connection with the arrangement of the various parts which constitute the completed vehicle as a product.

The bearing 31 has a combination of resultant static and dynamic forces on it when the vehicle is driven. With the engine 17 and transmission 18 being tilted downwardly as shown in Fig. 2 and with the protuberant portion of the differential 19 being inclined slightly downwardly as shown in full lines in this figure so that it starts its windup from its full line position, the resultant static force at the bearing 31 is in the horizontal direction from right to left as seen in Figure 3, assuming that the drive shaft assembly is rotating in the direction indicated by the arrow in Figure 2, and increases with the torque transmitted from the engine 17 through the drive shaft assembly to the rear axle assembly 15 and increases also as the angle at the universal joint 24 changes due to increased windup. The resultant dynamic forces at the bearing 31 increase generally in accordance with increased torque and increased windup of the differential assembly 19. The resultant of these dynamic forces at the bearing will tend to balance each other out if they oppose each other, and this would occur if the bearing 31 were moved to an optimum position for the various operating conditions of the drive shaft assembly as hereinafter more fully described.

We have found that these resultant dynamic forces at the bearing 31 which tend to vibrate the drive shaft section 20 and the associated section 21 may be balanced out against each other by lowering the bearing 31 as the windup of the rear axle assembly increases, and this results in a comparatively smooth operating drive shaft assembly. In order to accomplish this, the ramps 27 and 28 are set at an angle, inclining downwardly to the left, viewed from the rear of the vehicle, so that the resultant horizontal static force on the bearing 31 which acts to the left tends to move it downwardly against the reaction of C spring 38 which initially supports the weight of the bearing 37 and the middle portion of the drive shaft assembly. The resultant static force on the bearing 31, as the vehicle is accelerated forwardly causes the bearing to roll downwardly on the C spring 38 in proportion to the resultant horizontal static force on the bearing 31 until stopped by lower stop 37.

In the event that the brakes of the vehicle are applied, the differential 19 tends to swing counterclockwise as seen in Fig. 2 in the direction opposite that mentioned for a drive of the vehicle from the engine, and furthermore, there is transmission of torque from the rear axle assembly 15 through the drive shaft assembly back to the engine 17, and therefore, the resultant static force on the bearing 31 is from left to right as seen in Fig. 3. This static force tends to roll the bearing 31 up the inner face 30 of the ramp 28 and if of sufficient magnitude causes the bearing 31 to be deflected by the spring extension 39 toward the inner face 30 thereby continuing its contact with the face 30. The upper stop 36 is provided for yieldably restraining such upward movement of the bearing 31 due to the bowed shape of the stop under such vehicle braking conditions so as to locate the bearing at a position most compatible for smooth operation of the drive shaft assembly under those conditions. The rubber ring 35 around the bearing 31 cushions the movement against the upper stop 36.

In further explanation with regard to the action of this mechanism, it may be pointed out that since the bearing 31 which is mounted on the shaft section 20 is not fixed to any other part of the automotive vehicle, it is free to move within the confines of the ramps 27 and 28. Such movement is in the nature of a rolling action on one of the ramps, depending on the direction of the horizontal force at the moment. If the horizontal force is toward the ramp 27, there is a pressure contact between the rubber ring 35 and a point on the face of C spring 38 in the lower left quadrant of the ring 35 defined by horizontal and vertical lines through the center of the bearing 31. Conversely, if the horizontal force is toward the ramp 28, there is a pressure contact between the rubber ring 35 and a point on the inner face 30 of ramp 28 in the lower right quadrant. If the horizontal force is in the direction toward the ramp 27, the bearing 31 rolls downwardly on the C spring 38 and there is a scuffing or braking action between the other side of the rubber ring 35 at its periphery and the inner face 30 of the ramp 28. Conversely, if the horizontal force is toward the ramp 28, there is a scuffing or braking action between the other side of the ring 35 at its periphery and the face of the C spring 38. These rolling actions combined with the scuffing or braking actions just mentioned, have a tendency to slow up the movement of the bearing under initial high torque on the drive shaft assembly, thereby better controlling it from the standpoint of proper positioning for smooth operation. It should be noted that the ramps 27 and 28 of the U shaped support 25 converge whereby the bearing 31 will be subject to wedging action due to the convergence of the ramps 27 and 28 as it rolls downwardly on the C spring 38, thereby further retarding the downward movement of the bearing, intensifying the scuffing or braking action as pointed out above and also tending to dampen vibratory forces and eliminate vibration at resonant frequencies of the drive shaft assembly.

The second embodiment of the bearing support mechanism shown in Fig. 4 comprises a pair of curved substantially concentric ramps 40 and 41 mounted on a backing plate 26 and inclining downwardly to the left as viewed from the rear of the vehicle and spaced apart so that the bearing 31 may be disposed therebetween. The ramp 40 has an inner concave face 42 and the ramp 41 has an inner convex face 43 so that the bearing 31 moves in a slight arc between these two faces under the influence of the resultant static force as heretofore mentioned.

A spring member 44 is provided to initially support the weight of the bearing 31 and the middle portion of the drive shaft assembly and to provide progressive resistance to the downward movement of the bearing 31 under the influence of resultant static force until arrested by a lower stop 45 which is a rectangular shaped block of metal attached to the lower flange of the backing plate 26. An upper stop 46 in the form of an angle is attached to the backing plate 26 and is provided to limit the upward movement of the bearing 31.

When the horizontal static force on the bearing 31 is from right to left, viewed from the rear of the vehicle, the concentric curvature of the inner faces 42 and 43 of the ramps 40 and 41 causes the bearing 31 to take a downward course in a slight arc thereby setting up an increasing resistance to its downward movement augmenting the increasing resistance of spring 44 as it is flexed.

The third embodiment of the bearing support mechanism as shown in Fig. 5 comprises a pair of parallel ramps 47 and 48 mounted on a backing plate 26 and having inner faces 49 and 50 respectively. The ramps incline downwardly to the left as viewed from the rear of the vehicle and are spaced apart so that the bearing 31 may be disposed therebetween.

A spring member 51 is provided to initially support the weight of the bearing 31 and the middle portion of the drive shaft assembly and to provide progressive resistance to the downward movement of the bearing 31 under the influence of the aforesaid resultant static force until arrested by a lower stop 52 which is a rectangular shaped block of metal attached to the lower flange of the backing plate 26. An upper stop 53 of any suitable material is attached to the backing plate 26 and is provided to limit the upward movement of the bearing 31.

This embodiment is similar in every respect to the one shown in Fig. 3 except as to the faces of the ramps which are straight and do not have curvatures as in the second embodiment. The functioning is also the same except as to the downward movement of the bearing 31 which continues in a straight line and does not move in a slight arc.

The fourth embodiment of the bearing support mechanism shown in Fig. 6 is similar to the one shown in Fig. 4, but differs principally with respect to stop mechanism for the bearing. A U shaped bearing support 54 mounted on a backing plate 26 comprises a pair of ramps 55 and 56 having inner faces 57 and 58 respectively. The support 54 is formed with a downwardly protruding portion 59 serving as an upper stop for the bearing 31.

Lower stop mechanism for the bearing comprises a lever 60 pivoted at one end to the backing plate 26 by a pin 61 and pivotally connected to a piston arm 62 at the other end by a pin 63. The piston arm 62 carries a cup 64 at its other end which is positioned in a closed end cylinder 65 pivotally mounted to the backing plate 26 by a pin 66. The closed end of the cylinder 65 in conjunction with the cup 64 forms a unidirectional dashpot 67 which has a bleed hole 68. A spring 69 is biased between the open end of the cylinder 65 and the cup 64. A roller 70 is carried by the lever 60 and is provided as a contact means with respect to the bearing 31. A flat spring 71 is positioned beneath and spaced from the roller 70 and is mounted on a lower flange of the backing plate 26 and serves as a secondary yieldable stop. The flat spring 71 has a U shaped end 72 resting on the lower flange of the plate 26.

Under no-torque conditions, the bearing 31 rests on the roller 70 and is supported together with the middle portion of the drive shaft assembly by the lever 60 supported by the spring 69.

As the vehicle is accelerated forwardly and the resultant static force acts from right to left, the static force causes the bearing 31 to move downwardly between the confines of the ramps 55 and 56, against the bias of spring 69, causing the lever 60 to move downwardly whereby roller 70 contacts the flat spring 71 thereby setting up a second stage of resistance to the downward movement of the bearing 31. By the same token any reduction in the drive line torque due to a change from the acceleration condition to a constant cruising speed condition allows the springs 69 and 71 to move the bearing up to a new position by virtue of the reduced static force from right to left. During either downward or upward movement of the bearing 31, the rubber ring rolls on either the inner face 57 or the inner face 58. Assuming that the bearing 31 is in its second stage as above mentioned with the rubber ring 35 in contact with the roller 70, the roller 70, during such upward and downward movement of the bearing, rolls on either the bearing ring 35 or else on the flat spring 71 and has a scuffing or rubbing action on the other thereby producing frictional damping insofar as the bearing is concerned. The rubber ring 35 deflects on the inner face 57 or the inner face 58. This also produces damping, and both of these damping actions aid in the elimination of vibration and resonance frequencies of the drive shaft assembly. When the vehicle brakes are applied or the vehicle is driven in reverse, the static force is from left to right so that the bearing tends to move upwardly on the face 58 due to the horizontal static force augmenting the urging due to the springs 69 and 71, so that the bearing ultimately contacts the stop portion 59. The cup 44 coacting with the closed end of the cylinder 65 compresses the entrained air therein so that the return motion of the lever 60 is retarded with a gradual release of the air trapped in the cylinder 65. The unidirectional dashpot 67 thus inhibits chattering and vibration conditions at resonance frequencies of the drive shaft assembly. The unidirectional dashpot action results from the action of the cup 64 which permits air to enter around the lip of the cup 64 as it moves downwardly but prohibits escape of the air around the cup 64 due to the sealing action of the cup lip on the upward stroke.

It should be noted that the U-shaped end 72 of the spring 71 is under no load conditions, as it is spaced from the lower flange of the backing plate 26. When the bearing 31 moves downwardly sufficiently, the end 72 of the spring 71 contacts the lower flange of the backing plate 26, and thereafter the spring 71 provides a third stage of increased resistance to down travel of the bearing 31. The scuffing action of the spring end 72 on the lower flange of the backing plate 26 provides additional damping.

Advantageously, our device, when installed in a vehicle employing a three universal joint type of drive shaft assembly, functions in such a manner under driving conditions so as to cause smooth operation in the drive shaft assembly at all times regardless of whether there is engine torque or brake torque or regardless of change in the universal joint angles. As pointed out above, there are two different types of resultant forces, static and dynamic, at the bearing 31 engendered in the drive shaft assembly. The resultant static force is substantially horizontal and acts from right to left as seen in Figs. 3 to 6 for the particular inclination of the engine 17 and transmission 18 and have the particular angle of the differential 19, as is shown in Fig. 2. The resultant static force increases with the torque transmitted through the drive shaft assembly and with the inclination that the differential 19 has with increased drive shaft torque. The resultant dynamic forces are multi-directional and vibratory and cause vibration of the vehicle and these in general increase along with the static force. In order to maintain smooth operation in the drive shaft assembly with changes in torque and universal joint angles, it is necessary to have the resultant dynamic forces substantially cancel each other out, and this is brought about by causing the resultant static force to act on the bearing 31 so as to position it downwardly between the inclination of the opposing ramps against action of spring mechanism.

The inclined ramps, as contrasted to other mechanisms for moving the bearing downwardly with increased static force, advantageously are compact and economical of manufacture. The ramps also may be so arranged to provide a damping action on the bearing inhibiting vibration at resonant frequencies of the drive shaft assembly.

We wish it to be understood that our invention is not to be limited to the specific constructions and arrangements shown and described, except only insofar as the claims may be so limited, as it will be understood to those skilled in the art that changes may be made without departing from the principles of the invention.

We claim:

1. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said bearing having a resultant substantially horizontal force on it when there is angularity in one or more of said universal joints in a vertical plane and said drive element is effective to drive said driven element through said assembly and a guide for said bearing fixed to the automotive vehicle in a direction inclined with respect to said force so that said force moves said bearing in a fixed direction parallel to said guide which is generally upwardly or downwardly to reposition the bearing to reduce vibration in said drive shaft assembly.

2. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said bearing having a resultant substantially horizontal force on it when there is angularity in one or more of said universal joints in a vertical plane and said drive element is effective to drive said driven element through said assembly and a ramp for said bearing fixed to the automotive vehicle in an inclined direction, said bearing being movable on the ramp under the influence of said horizontal force due to the inclination of said ramp so as to move said bearing in a fixed upwardly or downwardly direction to re-position it for reducing vibration in said drive shaft assembly.

3. In an automotive vehicle having a body, the combination of a drive shaft assembly comprising two shaft sections connected together by a universal joint with universal joints at opposite ends of said shaft sections connecting the said drive shaft assembly to said automotive vehicle, a bearing mounted on one of said sections, a resultant substantially horizontal force existing on said bearing when there is angularity in one or more said universal joints in a vertical plane and said drive shaft assembly is under torque, said horizontal force being effective to exert itself in either direction depending on the direction of drive and the angularity of the said universal joints and a pair of ramps, one on each side of said bearing, said ramps being fixed to the automotive vehicle in a direction inclined with respect to said force so that said force moves said bearing in a fixed direction between said ramps which is generally upwardly or downwardly to reposition the bearing to reduce vibration in said drive shaft assembly.

4. In combination, a drive element and a driven element, a drive shaft assembly connected between said two elements and comprising first and second drive shaft sections, a universal joint between said drive element and said first drive shaft section, a universal joint between said two sections, a universal joint between said second section and said driven element, a bearing for supporting one of said drive shaft sections, said last named drive shaft section having a resultant substantially horizontal force on it when there is angularity in one or more of said universal joints in a vertical plane and said drive element is effective to drive said driven element through said assembly, and a pair of inclined ramps, one on each side of bearing, for limiting the movement of said bearing in a fixed generally vertical direction under the influence of said horizontal force for the purpose of reducing vibratory forces in said drive shaft assemly.

5. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft joint between said first and second section, a universal joint between said second section and said driven element, a bearing supporting one of said sections, said bearing having a resultant substantially horizontal force on it when there is angularity in one or more said universal joints in a vertical plane and said drive element is effective to drive said driven element through said assembly, and a pair of ramps, one on each side of said bearing, fixed to the automotive vehicle, said ramps being inclined with respect to vertical so that said horizontal force moves said bearing downwardly between said ramps on an increase in torque transmitted from said drive element through said shaft assembly to said driven element.

6. In an automotive vehicle having a body, the combination of a drive element and a driven element, a drive shaft assembly connected between said two elements comprising first and second drive shaft sections, a universal joint between said drive element and said first drive shaft section, a universal joint between said first and second sections, a universal joint between said second sections and said driven element, a bearing for supporting one of said drive shaft sections, a rubber ring around said bearing, said bearing having a first resultant substantially horizontal force on it in one direction when the automotive vehicle is driven forwardly and a second horizontal force on it in the other direction when brakes are applied to said automotive vehicle, a pair of ramps one on each side of said bearing, fixed with respect to said body, said ramps being inclined with respect to vertical so that said first horizontal force in said one direction on said bearing moves said bearing generally vertically in one direction between the said ramps and said second horizontal force moves said bearing generally vertically in the other direction between said ramps, a stop means below said bearing fixed with respect to said body, and a stop means above said bearing fixed with respect to said body.

7. In an automotive vehicle having driving road wheels and an engine, the combination of a drive element adapted to be driven by the vehicle engine, a driven element adapted to drive the road wheels, a drive shaft assembly connected between said elements and comprising first and second drive shaft sections, a universal joint between said drive element and said first drive shaft section, a universal joint between said first and second sections, a universal joint between said second section and said driven element, a bearing mounted on one of said sections adjacent the universal joint which connects said first and second sections, said bearing having a resultant substantially horizontal force on it when there is angularity in one or more said universal joints in a vertical plane and said drive element is effective to drive said driven element through said assembly, a pair of ramps, one on each side of said bearing, fixed to the automotive vehicle and being inclined with respect to vertical so that said horizontal force moves said bearing downwardly between said ramps and a resilient member fixed with respect to said vehicle effective on said bearing for yieldably holding said bearing against the action of said horizontal force.

8. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections adjacent the universal joint which connects the said first and second sections, said bearing having a resultant substantially horizontal force on it when there is angularity in one or more said universal joints in a vertical plane and said drive element is effective to drive said driven element through said assembly, a pair of ramps, one on each side of said bearing, fixed to the automotive vehicle and being inclined with respect to vertical so that said horizontal force moves said bearing downwardly between said ramps on an increase in torque transmitted from said drive element through said drive shaft assembly to said driven element, and a yieldable support connected with respect to said vehicle holding said bearing from movement from the action of said horizontal force in two stages of resistance, the first stage for initially yieldably holding said bearing with a relatively small resistance and subsequently holding said bearing in a second stage action with a relatively large resistance.

9. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections, said bearing having a resultant horizontal force in one direction on it when there is angularity in one or more of said universal joints in a vertical plane and said drive element is effective to drive said driven element through said assembly and having a resultant substantially horizontal force in the other direction on it when said driven element is effective to drive said drive element through said assembly, a pair of ramps, one on each side of said bearing and fixed to the automotive vehicle, said ramps being inclined with respect to vertical so that said horizontal force in said one direction moves said bearing downwardly between said ramps and said horizontal force in said other direction moves said bearing upwardly between said ramps, a stop fixed with respect to said vehicle resiliently limiting the movement of said bearing downwardly from the action of said horizontal force in said one direction and having a two-stage action to initially in a first stage yieldably hold said bearing with a relatively small resistance and subsequently hold said bearing in a second stage with a relatively large resistance, and a second stop fixed with respect to said vehicle for limiting the movement of said bearing upwardly under the influence of the said horizontal force in said other direction.

10. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections, said bearing having a resultant horizontal force from right to left, viewed from the rear of said vehicle, when there is angularity in one or more of said universal joints in a vertical plane and said drive element is effective to drive said driven element through said assembly, and having a resultant substantially horizontal force in the other direction on it when said driven element is effective to drive said drive element through said assembly, a pair of ramps, one on each side of said bearing and fixed to the automotive vehicle said ramps inclining downwardly to the left as viewed from the rear of said vehicle so that said horizontal force from right to left acts on said bearing so as to move said bearing upwardly between said ramps; and so that said horizontal force in said other direction acts on said bearing so as to move said bearing downwardly between said ramps, a flat spring mounted on a part fixed to the automotive vehicle for yieldably supporting said bearing, a lower stop means fixed with respect to said vehicle for limiting the downward movement of said bearing under the influence of said horizontal force from right to left and a yieldable stop means fixed with respect to said vehicle for limiting the upward movement of said bearing under the influence of said horizontal force in said other direction.

11. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant substantially horizontal force on it when there is angularity in one or more said universal joints in a vertical plane and said drive element is effective to drive said driven element through said assembly, a pair of ramps one on each side of said bearing, fixed to the automotive vehicle and being inclined with respect to vertical so that said horizontal force acting on said bearing moves said bearing downwardly between said ramps on an increase in torque transmitted from said drive element through said drive shaft assembly to said driven element, and a flat spring fixed with respect to said vehicle effective for yieldably limiting the downward movement of said bearing under the influence of said horizontal force.

12. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant substantially horizontal force on it in one direction when the automotive vehicle is driven forward and a horizontal force on it in the other direction when brakes are applied to the automotive vehicle, a pair of ramps, one on each side of said bearing, fixed with respect to said body and being inclined with respect to vertical so that said horizontal force in said one direction on said bearing moves said bearing downward between said ramps on an increase of torque transmitted through said drive shaft assembly when the automotive vehicle is driven forward, a flat spring fixed with respect to said vehicle effective to yieldably resist the downward movement of said bearing under the influence of said horizontal force, a lower stop member fixed with respect to said vehicle limiting the downward movement of said bearing and an upper stop member fixed with respect to said vehicle effective to limit the movement of the bearing in an upward direction between said ramps when said force is effective to move said bearing in an upward direction.

13. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant substantially horizontal force on it in one direction when the automotive vehicle is driven forward and a horizontal force on it in the other direction when brakes are applied to the automotive vehicle, a pair of ramps, one on each side of said bearing, fixed with respect to said body and being inclined with respect to vertical so that said horizontal force in said one direction acting on said bearing moves said bearing downward between said ramps on an increase in torque transmitted through the drive shaft assembly when the automotive vehicle is driven forward, and so that the said horizontal force in said other direction acting on said bearing moves said bearing upward between said ramps when the said brakes are applied to the automotive vehicle, a C spring carried by one of said ramps effective to yieldably support said bearing, and a stop member fixed with respect to said body effective to limit the upward movement of said bearing under the influence of the said horizontal force in said other direction.

14. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant substantially horizontal force on it in one direction when the automotive vehicle is driven forwardly and a horizontal force on it in the other direction when brakes are applied to the automotive vehicle, a pair of ramps, one on each side of said bearing, fixed with respect to the vehicle body, said ramps being inclined with respect to vertical so that said horizontal force is effective to move said bearing downward as the horizontal force increases with increase in torque transmitted through said drive shaft assembly when the automotive vehicle is driven forward, a spring stop member fixed with respect to said body and positioned so as to resiliently support the initial load on said bearing under the influence of said torque and to resiliently resist in two stages additional loads that may be placed on said bearing under the influence of said increases in said torque, the first stage of resistance relatively light and the second stage of resistance being relatively strong, and a stop means fixed with respect to said body to limit the upward movement of said bearing under the influence of said horizontal force when said horizontal force is effective on said bearing in said other direction.

15. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, a rubber ring encompassing said bearing, said bearing having a resultant substantially horizontal force on it in one direction when the automotive vehicle is driven forward and a resultant horizontal force on it in the other direction when brakes are applied to the automotive vehicle, and a pair of ramps, one on each side of said bearing and fixed with respect to said body and being inclined with respect to vertical so that said horizontal force moves said bearing downward on an increase in torque transmitted through said drive shaft assembly when said automotive vehicle is driven forward.

16. In an automotive vehicle having a body, a drive element and a driven element, a drive shaft assembly connected between said two elements comprising first and second drive shaft sections, a universal joint between said drive element and said first drive shaft section, a universal joint between said second section and said driven element, a bearing for supporting one of said drive shaft sections, a rubber ring encompassing said bearing, said bearing having a resultant substantially horizontal force on it in one direction when the automotive vehicle is driven forwardly and a horizontal force on it in the other direction when brakes are applied to the automotive vehicle, a pair of ramps, one on each side of said bearing and fixed with respect to said body and being inclined with respect to vertical so that said horizontal force when the automotive vehicle is driven forward moves said bearing downward on an increase in torque transmitted through said drive shaft assembly, a spring support means fixed with respect to said body to initially yieldably support said bearing, and means fixed with respect to said body for resiliently limiting downwardly the movement of said bearing under the influence of an increase in said horizontal force.

17. In an automotive vehicle having driving road wheels and an engine, the combination of a drive element adapted to be driven by the vehicle engine, a driven element adapted to drive the road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, a rubber ring encompassing said bearing, said bearing having a resultant substantially horizontal force on it when there is angularity in one or more of said universal joints in a vertical plane and said drive element is effective to drive said driven element through said assembly, a pair of ramps fixed to said vehicle, one on each side of said bearing, one of said ramps having a convex inner face and the other said ramp a concave inner face, so that said horizontal force moves said bearing downward between said ramps, and means fixed with respect to said body resiliently opposing such downward movement of said bearing.

18. In an automotive vehicle having driving road wheels and an engine, the combination of a drive element adapted to be driven by the vehicle engine, a driven element adapted to drive said road wheels, a drive shaft assembly connected between said two elements and comprising first and second drive shaft sections, a universal joint between said drive element and said first drive shaft section, a universal joint between said first and second sections, a universal joint between said second section and said driven element, a bearing for supporting one of said drive shaft sections, a rubber ring encompassing said bearing said bearing having a resultant substantially horizontal force on it when there is angularity in one or more of said universal joints in a vertical plane and said drive element is effective to drive said driven element through said assembly, a pair of ramps fixed to said vehicle, one on each side of said bearing, said ramps having straight inner faces and converging at their lower ends said ramps being inclined with respect to vertical so that said horizontal force is effective to move said bearing downward between said ramps, and means fixed with respect to said vehicle resiliently opposing such downward movement of said bearing.

19. In an automotive vehicle having driving road wheels and an engine, the combination of a drive element adapted to be driven by the vehicle engine, a driven element adapted to drive said road wheels, a drive shaft assembly connected between said two elements and comprising first and second drive shaft sections, a universal joint between said drive element and said first drive shaft section, a universal joint between said first and second sections, a universal joint between said second section and said driven element, a bearing mounted on one of said sections adjacent the universal joint which connects the said first and second sections, a rubber ring encompassing said bearing, said bearing having a resultant substantially horizontal force on it when there is angularity in one or more said universal joints in a vertical plane and said drive element is effective to drive said driven element through said assembly, a pair of ramps, one on each side of said bearing, fixed to the automotive vehicle and being inclined with respect to vertical so that said horizontal force moves said bearing downward between said ramps on an increase in torque transmitted from said drive element through said drive shaft assembly to said driven element; and a lower yieldable support means fixed with respect to said vehicle comprising a lever pivoted at one end on a part fixed with respect to the said automotive vehicle and pivotally connected to a piston arm at the other end, the said piston arm having a cup at one end, a cylinder open at one end and closed at the other end and having a bleedhole therein at its closed end, the said cylinder being pivotally mounted at its closed end on a part fixed with respect to the said automotive vehicle, the said cup being inserted into the open end of said cylinder, a spring biased between said open end of said cylinder and the said cup thereby forming a unidirectional dash pot for inhibiting possible oscillatory movement of the said bearing which may result from resonant frequencies of said drive shaft assembly, a rotatable member carried by said lever in contact relationship with said rubber ring whereby under the influence of said increase in torque the said bearing in its downward movement moves the said lever downward against the reaction of said biased spring, and a flat spring below said roller mounted on a part fixed to the said vehicle, said flat spring having a downward extending U-shaped portion whereby under the influence of increasing torque contact is made between said roller and said flat spring, causing said flat spring to move downward and make contact between the said U-shaped portion and a flange mounted on a part fixed to the said vehicle whereby stages of resistance are set up in the downward movement of said bearing.

20. In an automotive vehicle having a body, a drive element and a driven element, a drive shaft assembly connected between said two elements comprising first and second drive shaft sections, a universal joint between said drive element and said first drive shaft section, a universal joint between said first and second sections, a universal joint between said second section and said driven element, a bearing for supporting one of said drive shaft sections, said bearing having a resultant substantially horizontal force on it in one direction when the automotive vehicle is driven forward and a horizontal force on it in the other direction when brakes are applied to the automotive vehicle, a pair of ramps, one on each side of said bearing, fixed with respect to said body and being inclined with respect to vertical so that said horizontal force acting on said bearing moves said bearing downward between said ramps on an increase in torque transmitted through said drive shaft assembly when the automotive vehicle is driven forward and so that the said horizontal force in said other direction acting on said bearing moves said bearing upward between said ramps when the said brakes are applied to the automotive vehicle, a C spring carried by one of said ramps yieldably supporting said bearings at its lower end, a stop means fixed with respect to said vehicle effective to limit the downward movement of said bearing under the influence of said horizontal force on said bearing in said one direction, an extension of said C spring at its upper end for maintaining said bearing in contact with said other ramp when the said bearing moves upward under the influence of the said horizontal force on said bearing in said other direction, and a stop means fixed with respect to said vehicle to limit the said upward movement of said bearing.

References Cited in the file of this patent
UNITED STATES PATENTS

| | | |
|---|---|---|
| 1,324,379 | Bicknell | Dec. 9, 1919 |
| 2,507,406 | Hardy | May 9, 1950 |
| 2,560,759 | Evernden | July 17, 1951 |